United States Patent
Perlman et al.

[19]

[11] Patent Number: 6,128,291

[45] Date of Patent: *Oct. 3, 2000

[54] SYSTEM AND METHOD FOR ESTABLISHING A CALL TELECOMMUNICATIONS PATH

[75] Inventors: Andrew T Perlman, Newton, Mass.; Mark S Land, Merrick, N.Y.; Steven J Kruy, Norwalk, Conn.; Edward A Walvick, Livingston, N.J.

[73] Assignee: Cignal Global Communications, Inc., Boston, Mass.

[ * ] Notice: This patent is subject to a terminal disclaimer.

[21] Appl. No.: 08/930,595

[22] PCT Filed: Jun. 5, 1997

[86] PCT No.: PCT/US97/09561

§ 371 Date: Jan. 7, 1998

§ 102(e) Date: Jan. 7, 1998

[87] PCT Pub. No.: WO97/47114

PCT Pub. Date: Dec. 11, 1997

Related U.S. Application Data

[63] Continuation-in-part of application No. 08/659,677, Jun. 5, 1996.

[51] Int. Cl.[7] .............................. H04L 12/66; H04L 12/28
[52] U.S. Cl. ........................... 370/352; 370/401; 379/114
[58] Field of Search .................................. 370/352, 353, 370/354, 355, 356, 401, 410, 466, 467, 475, 395; 379/88.12, 88.13, 113, 114, 115, 221

[56] References Cited

U.S. PATENT DOCUMENTS

| | | | |
|---|---|---|---|
| 5,101,451 | 3/1992 | Ash et al. | 379/221 |
| 5,724,407 | 3/1998 | Bruno et al. | 379/88.13 |
| 5,751,706 | 5/1998 | Land et al. | 370/352 |
| 5,790,538 | 8/1998 | Sugar | 370/352 |

*Primary Examiner*—Chi H. Pham
*Assistant Examiner*—Kwang B. Yao
*Attorney, Agent, or Firm*—Covington & Burling

[57] ABSTRACT

This invention provides a path establishment device and method for establishing a path for a telecommunications call. In a preferred embodiment, the path establishment device of this invention includes an originating call processor in communication with an originating telecommunications network and a packet-based telecommunications network, a terminating call processor in communication with the packet-based telecommunications network and a public telecommunications network, and means for establishing a communication path from the originating telecommunications network through the packet-based telecommunications network to a destination served by the public telecommunications network. The path establishment device and method of the present invention thus provides, among other advantages, for the use of a potentially less expensive packet-switched telecommunications network as a long distance carrier between two public switched telecommunications networks.

14 Claims, 5 Drawing Sheets

SYSTEM AND METHOD FOR ESTABLISHING A CALL TELECOMMUNICATIONS PATH

This is a continuation-in-part of U.S. application Ser. No. 08/659,677, filed Jun. 5, 1996.

BACKGROUND OF THE INVENTION

This invention relates to the establishment of a path for a telecommunications call, and more particularly to the establishment of a call telecommunications path through a packet-based telecommunications network interconnected with a public telecommunications network.

DESCRIPTION OF THE RELEVANT ART

Since the invention of the telephone, the world has seen the steady and often explosive growth of telecommunications networks. Telecommunications services throughout the world are linked to provide access from virtually any country to virtually any other country, with governments and private companies operating many telecommunications networks, both nationally and internationally. Some of these telecommunications networks are for the private use of the owning or operating entity. Others are operated by common carriers or by telecommunications service providers for use by the public or for use by a limited group of subscribers.

Telecommunications networks are not all alike. There are wide variations in the speed at which information is transported over telecommunications networks and in the ways in which networks interconnect and interface with other networks. Because of such differences in speed, interfaces, and modes of operation, many telecommunications networks cannot be interconnected with other telecommunications networks.

With the proliferation of telecommunications networks, it is not surprising that some networks are more heavily used than others. The complexities and difficulties involved in interconnecting networks, however, often prevent users of crowded and expensive telecommunications networks, for example, from switching to less crowded and less expensive telecommunications networks.

An additional problem with the substitution of one telecommunications network for another is that different networks may not provide service to or be readily accessible from the same geographic areas. Even if the service areas of different networks overlap significantly, the potential user of an alternate telecommunications network must constantly keep in mind which areas can be reached from or by which network.

This coverage area problem is only one example of a larger problem faced by users of multiple telecommunications networks: the overall operating environments, parameters, and instructions of different networks are often very dissimilar. A user seeking to use multiple networks thus may have the additional burden of learning completely different telecommunications network operating systems.

The problems typically encountered today with multiple network use may be illustrated by considering one of the most popular telecommunications services, basic telephony. Despite considerable progress, public telephone networks, and particularly international public telephone networks, are often expensive and sometimes unreliable. Individual consumers and companies that do not have their own private international telephone telecommunications systems, however, have few alternatives to the use of these public networks. Even companies with their own private telecommunications systems for their internal use must bear the added costs of maintaining their switches and telecommunications facilities, and may in any event encounter significant problems in interconnecting with public telecommunications systems.

Recently, a number of large capacity international telecommunications networks have been developed, primarily for the transport of data. These networks use frame-relay ("FR"), asynchronous transfer mode ("ATM") or other packet-based technologies. A packet-based network sends data through the network by breaking a large message into blocks or "packets" of limited size. Individual packets are then transmitted through the network, and reassembled into the original large message at the destination of the message. Thus, packets may not arrive at their network destination in the same order that they were sent.

Packet-based networks frequently have excess telecommunications capacity that is available at relatively low cost. With appropriate techniques, packet-based networks may thus provide cost-effective alternatives to public telephone networks for voice communications.

Unfortunately, use of packet-based networks for voice services and the like confronts the interconnection and other problems described above. Packet-based networks typically are not built to interface with the public telephone networks, so interconnecting such disparate systems requires the resolution of several problems. For example, voice communications is a continuous and frequently an analog process. Packet-based systems, as noted above, typically communicate by exchanging discrete "packets" or blocks of digital data. Taking continuous analog voice as an example, the voice signal would have to be converted to digital form and then split up into packets of appropriate size for a packet-based network. These packets would then be sent over the network. At the destination, the packets may not arrive in the order they were sent, and the amount of time it takes for each packet in a message to travel through the network may vary substantially from the travel time of other packets in the same message. Somehow, the packets have to be collected at the destination and reassembled in the order in which they were sent. The digital voice signal contained in the packets would then have to be converted back to analog. For voice transmission, this whole process would have to be done very quickly so that each participant in a voice telephone conversation would not notice any unusual time delays.

Fortunately, voice interfaces for packet-based systems have been introduced to convert between analog or digital voice and the digital packets. Voice interfaces for the packet-based Internet have also recently been made available. Companies with internal private branch exchange ("PBX") and packet-based networks have used these voice interfaces to provide limited telephone services over their internal packet-based networks.

This solution, however, is limited to the relatively small number of points served by the packet-based networks. At least in industrialized countries, the vast majority of residents and businesses use telephone service provided by public telephone systems, at least for their long distance domestic or international calls. Very few individuals or businesses are directly served by packet-based networks. The widespread and practical use of the packet-based networks thus requires that they be able to transport calls originating from public networks and terminating to public networks. To permit this mode of operation a packet-based network must interface directly with public telephone networks, and operate as a bridge between local public telephone networks on the originating and destination ends of a call.

Interfaces between a packet-based network and a public telephone network, however, may require costly and complex modifications to the public telephone network, or modifications to the packet-based network so that it mimics other, less powerful equipment, such as private branch exchanges, that has historically been connected to the public telephone networks. A related interface problem is the user interface. Individuals are accustomed to using the public telephone systems and generally store large collections of telephone numbers. Individuals who make long distance and international calls are familiar with the procedures required by their public telephone systems for making these calls. Using packet-based networks for telephony today, however, frequently requires special procedures with which individuals may not be familiar. It is costly and time consuming to train people to use these special procedures to access a packet-based system for their telephone calls, and similarly inconvenient to require special telephone numbers or other codes to be used. It may also be difficult for individuals to determine when it is cost-effective to invoke the packet-based system and when it is not.

Use of packet-based network s for public telephone service has also been frustrated by access and billing difficulties. Public telephone networks generally have means for controlling the use of the networks so that unauthorized users cannot make telephone calls. This is done by placing telephones in secure locations (such as homes or offices), requiring payment prior to use, or validating a payment mechanism such as a credit card prior to network use. Packet-based networks, intended for controlled, non-public environments, generally lack many of these access control features.

Billing arrangements present a similar problem. Public telephone systems have a wide range of mechanisms for measuring calls so that users can be billed appropriately. To date, packet-based systems have generally had no need for such call tracking mechanisms because they have been used primarily for internal telecommunications, where detailed accountings may not be required.

The usage measuring problem is exacerbated if the packet-based network is used as a bridge between public telephone networks, since the public networks will have direct control over both the call origination process and the contacting of the call destination, and full information on the originator, destination, duration, and length of the call, for example, would not normally be available to the packet-based network.

SUMMARY OF THE INVENTION

An object of the invention is to provide low cost telecommunications calls to subscribers who do not have access to large private telecommunications systems.

A further object of the invention is to provide a system and method for establishing a call telecommunications path from one telecommunications system to another telecommunications system via a packet-based telecommunications system.

A further object of the invention is to provide a system and method for establishing a call telecommunications path from an originating telecommunications system to a terminating telecommunications system via a packet-based telecommunications system using the regular call establishment formats of the originating and terminating telecommunications systems.

A further object of the invention is to provide a system and method for transparent establishment of call telecommunications paths so that subscribers can use packet-based networks without modifying their customary behavior for establishing telecommunications calls.

A further object of the invention is to provide a system and method to prevent unauthorized entities from establishing call telecommunications paths through a packet-based network interconnected with a public telecommunications network.

A further object of the invention is provide a system and method to generate bills and usage records concerning the establishment of call telecommunications paths by subscribers to a packet-based network interconnected with a public telecommunications network.

The present invention, as broadly described herein, provides a system for establishing a call telecommunications path including an originating call processor which is in communications with an originating telecommunications network and a packet-based network, a terminating call processor which is in communications with the packet-based network and a public telecommunications network, and a means for establishing a call telecommunications path through the originating telecommunications network and the packet-based network to a destination of the public telecommunications network. The invention can provide a communications path between telecommunications networks via a packet-based telecommunications network that, by way of example, employs frame-relay or asynchronous transfer mode technologies.

As broadly described herein, the system of the present invention may also include means for subscribers to generate a code, which can, for example, include a personal identification number and billing identification number, which is necessary in order to establish a call telecommunications path using the invention.

The present invention, as broadly described herein, also provides a method for establishing a call telecommunications path, including the steps of receiving a predetermined code from an originating telecommunications network into an originating call processor; identifying, based on all or a portion of the predetermined code, a terminating call processor; determining, based on the predetermined code, a destination code; transmitting the destination code from the originating call processor to a packet-based telecommunications network; receiving, into the terminating call processor, the destination code from the packet-based telecommunications network; converting the destination code to a destination address associated with a destination served by a public telecommunications network; and establishing a call communications path through the originating telecommunications network, the packet-based telecommunications network, and the public telecommunications network to the destination. As broadly described herein, the method of the present invention may also include the steps of generating the predetermined code in response to signals provided by a subscriber and transmitting the predetermined code to the originating telecommunications network.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Figure 1:
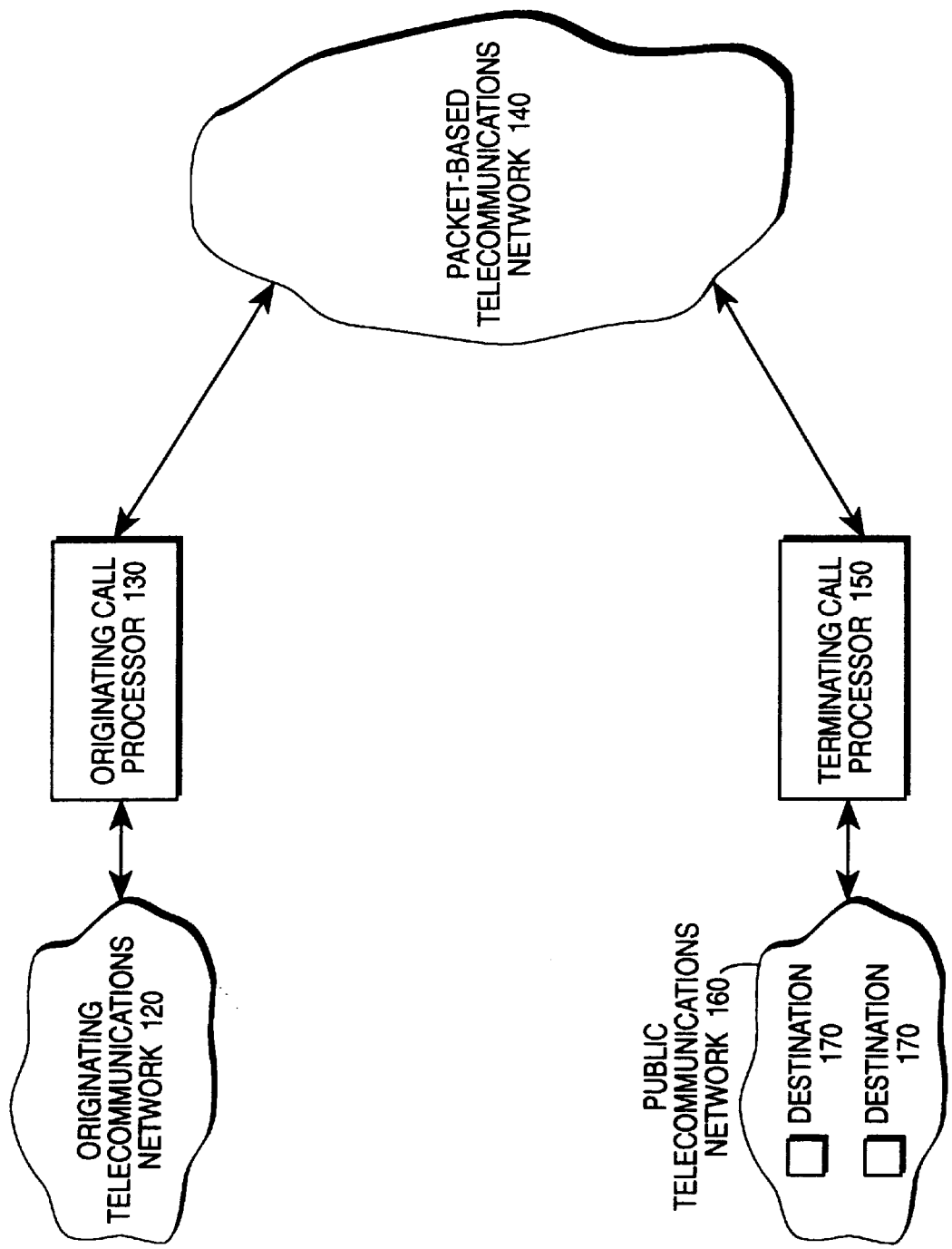
FIG. 1 is a diagram depicting a preferred embodiment of a system of the present invention for establishing a call telecommunications path.

Reference will now be made in detail to the present preferred embodiments of the invention, examples of which are illustrated in the accompanying drawings, wherein like reference numerals indicate like elements throughout the several views.

System for Routing a Telecommunications Call

FIG. 1 depicts a preferred embodiment of a system, comprising a combination of elements, for establishing a call telecommunications path. As depicted in FIG. 1, the system includes originating call processor 130 in communication with originating telecommunications network 120 and packet-based telecommunications network 140, terminating call processor 150 in communication with packet-based telecommunications network 140 and public telecommunications network 160, and means for establishing a communications path from originating telecommunications network 120 through packet-based telecommunications network 140 to destination 170 served by public telecommunications network 160. In a preferred embodiment not depicted in FIG. 1, the invention may include more than one originating call processor and more than one terminating call processor.

In the preferred embodiment depicted in FIG. 1, originating call processor 130 has means for receiving a predetermined code from originating telecommunications network 120. For example, the predetermined code may be encoded using dual tone multifrequency pulsing (DTMF) as is done in touch tone telephones. Circuitry, as is known in the art, in originating call processor 130 would capture the DTMF pulses. In a preferred embodiment, originating call processor 130 also has means, responsive to all or a portion of the predetermined code, for identifying terminating call processor 150 and means for determining and transmitting a destination code, based on the predetermined code, to terminating call processor 150 via packet-based telecommunications network 140.

For example, terminating call processor 150 may have an assigned address on packet-based telecommunications network 140. The identifying means of originating call processor 130, may, as is known in the art, use the predetermined code received from originating telecommunications network 120 as an index to a table which contains the assigned address of terminating call processor 150, thus producing the assigned address. The determining means of originating call processor 130 may then calculate a destination code based on the predetermined code, and create a packet addressed to terminating call processor 150 containing the destination code which the transmitting means would then send to packet-based telecommunications network 140 for transport to terminating call processor 150.

In a preferred embodiment terminating call processor 150 has means for receiving the destination code from packet-based telecommunications network 140. The receiving means of terminating call processor 150 may obtain packets from packet-based network 140 which are addressed to terminating call processor 150, including packets from originating call processor 130 which contained a destination code. Terminating call processor 150 preferably also has means for converting the destination code to a destination address associated with destination 170 served by public telecommunications network 160.

For example, the destination code may be the public telephone number, including area code, of destination 170. The converting means of terminating call processor 150 may, for example, determine that destination 170 is a local call, via public telecommunications network 160, and would therefore strip the area code from the destination code in order to produce the destination address.

Responsive to the destination address, the system of the present invention also has means for establishing a call telecommunications path from originating telecommunications network 120, through packet-based telecommunications network 140 and public telecommunications network 160, to destination 170 associated with the destination address.

In a preferred embodiment, the path establishment means may involve both terminating call processor 150 and originating call processor 130. For example (a) terminating call processor 150 may dial destination 170 via public telecommunications network 160 using the destination address (e.g., the local telephone number of destination 170) and then maintain an open call path through public telecommunications network 160; (b) terminating call processor 150 may provide format conversions as required between public telecommunications network 160 and packet-based telecommunications network 140 so that the call path from public telecommunications network 160 extends through terminating call processor 150 to packet-based telecommunications network 140; (c) terminating call processor 150 and originating call processor 130 may extend the call path through packet-based telecommunications network 140 by exchanging packets; (d) originating call processor 130 may provide format conversions as required between packet-based telecommunications network 140 and originating telecommunications network 120 so that the call path from packet-based telecommunications network 140 extends through originating call processor 130 to originating telecommunications network 120; and (e) originating call processor 130 may maintain the call path through originating telecommunications network 120 which was established when originating call processor 130 received the predetermined code from originating telecommunications network 120.

Originating Call Processor

In the preferred embodiment depicted in FIG. 1, originating call processor 130 is in communication with originating telecommunications network 120 and packet-based telecommunications network 140. In a preferred embodiment, originating call processor 130 is a digital computer dedicated to call processing functions. In other preferred embodiments, originating call processor 130 may be a general purpose digital computer, a special purpose call processor, or other communications processor as is known in the art.

In the preferred embodiment depicted in FIG. 1, originating call processor 130 provides a call communications path between originating telecommunications network 120 and packet-based telecommunications network 140 by performing format conversions between the two networks. The methods for performing the format conversions are known in the art. In a preferred embodiment where originating call processor 130 provides a full duplex call telecommunications path, originating call processor 130 packetizes continuous analog information received from originating telecommunications network 120 for output to packet-based telecommunications network 140, and converts packetized information received from packet-based telecommunications network 140 to continuous analog information for output to originating telecommunications network 120.

Originating call processor 130 has means, which are known in the art, for receiving a predetermined code from originating telecommunications network 120. For example, the predetermined code may be encoded using dual tone multifrequency pulsing (DTMF) as is done in touch tone telephones. Circuitry, as is known in the art, in originating call processor 130 would capture the DTMF pulses. In a preferred embodiment, the predetermined code includes a telephone number, formatted in accordance with the standard public telephone number formatting conventions of the locality in which the predetermined code was generated, that specifies a desired destination for a call. For example, to call Washington, D.C. local number 662-6000 from Los Angeles, the public telephone system would require entry of the digit "1" for a long distance call followed by the digits "202" for the area code of Washington, followed by the local number "662-6000." The predetermined code in this case would include the digits "12026626000." In another preferred embodiment, the predetermined code includes a sequence of characters, the sequence being selected in accordance with the formatting and call destination conventions of the dialing plan of a specific telecommunications system. In another preferred embodiment, the predetermined code includes a sequence of characters which has been predefined to specify a particular destination for a call.

In another preferred embodiment, the predetermined code has a format that is determined by the characteristics of the public telecommunications network, the packet-based telecommunications network, and the originating telecommunications network. These characteristics may include, by way of example, dialing plans, addressing schemes and formatting conventions. In this preferred embodiment, the predetermined code may specify all or any portion of the path through which the call is to be routed, as is known in the art, within any of the telecommunications networks traversed by the call telecommunications path.

In a preferred embodiment, the predetermined code includes personal identification information for the person or device making the call, originating call processor 130 validates the personal identification information by comparing it with a collection of valid, predetermined personal identification information stored in a table, or through other techniques which are known in the art. In a preferred embodiment, originating call processor 130 processes only those predetermined codes that contain valid personal identification information. In an alternate preferred embodiment, not depicted in FIG. 1, the originating call processor is also in communication with a monitoring system, and the personal identification information is passed to the monitoring system by the originating call processor for validation.

In a preferred embodiment, the personal identification information includes a personal identification number ("PIN"). PINs may be assigned to persons, devices, or both. In another preferred embodiment, the personal identification information may include calling line identification information or other caller identification information as is known in the art.

The predetermined code, in a preferred embodiment, includes a billing identification code which may be used to identify the entity to be charged for the call. Originating call processor 130 validates the billing identification code by comparing it with a list of valid billing identification codes stored in a table, or through other techniques which are known in the art. In a preferred embodiment, originating call processor 130 processes only those predetermined codes that contain a valid billing identification code. In an alternate preferred embodiment, not depicted in FIG. 1, the originating call processor is also in communication with a monitoring system and billing identification codes are passed to the monitoring system by the originating call processor for validation and bill generation.

In the preferred embodiment depicted in FIG.1, originating call processor 130 has means for identifying a particular terminating call processor 150 based on all or a portion of the predetermined code. In a preferred embodiment, each terminating call processor 150 has an address which is contained in a table which is stored within originating call processor 130. As is known in the art, the address of the selected terminating call processor 150 is obtained from the table by deriving an index to the table, the index being based on all or a portion of the predetermined code. In another preferred embodiment, the address of the selected terminating call processor 150 is obtained by applying a specified algorithm to all or a portion of the predetermined code.

Originating call processor 130 also has means for determining and transmitting a destination code, based on the predetermined code, to packet-based telecommunications network 140 for delivery to the selected terminating call processor 150. In a preferred embodiment, the determining means of originating call processor 130 calculates a destination code based on the predetermined code in accordance with a specified algorithm and creates a packet addressed to terminating call processor 150 which contains the destination code. The transmitting means of originating call processor 130 then sends the packet to packet-based telecommunications network 140 for transport to terminating call processor 150.

In a preferred embodiment, the destination code includes all or part of a telephone number, formatted in accordance with the standard public telephone number formatting conventions of the locality in which the predetermined code was generated, that specifies a desired destination for the call. For example, in the case of the Los Angeles to Washington, D.C. call discussed above, the predetermined code included the telephone number "12026626000." The destination code derived from this predetermined code may only include the digits "2026626000," since the leading "1" merely signals originating telecommunications network 120 that the call is not local and may not be necessary for further processing in the terminating call processor. In another preferred embodiment, the destination code includes all or part of a sequence of characters, the sequence being selected in accordance with the formatting and call destination conventions of the dialing plan of a specific telecommunications system. In another preferred embodiment, the destination code includes all or part of a sequence of characters which has been predefined to specify a particular destination for the call.

In a preferred embodiment not depicted in FIG. 1, communications in either direction between the originating call processor and the originating telecommunications network are amplified and conditioned through the use of an amplifying means. This amplifying means may include a dedicated telecommunications amplifier, PBX, amplification and line conditioning equipment, or other amplification and line conditioning equipment as is known in the art.

In the preferred embodiment depicted in FIG. 1, originating call processor 130 is in communication with originating telecommunications network 120. In preferred embodiments, originating call processor 130 is able to communicate with originating telecommunications networks 120 that include public switched telephone networks, private switched telephone networks, private branch exchanges (PBXs), packet-based networks, or other networks for the transmission of voice, fax, store-and-forward voice, store-and-forward fax, video, data, and other telecommunications modes and services, as are known in the art. In a preferred embodiment, originating telecommunications network 120 recognizes originating call processor 130 as a long distance carrier and automatically routes certain long distance calls to originating call processor 130.

In preferred embodiments not depicted in FIG. 1, the originating call processor is able to communicate with originating telecommunications networks that include direct hard-wired connections to the originating call processor, dedicated leased lines, or other non-switched communications facilities which are known in the art.

Figure 2:
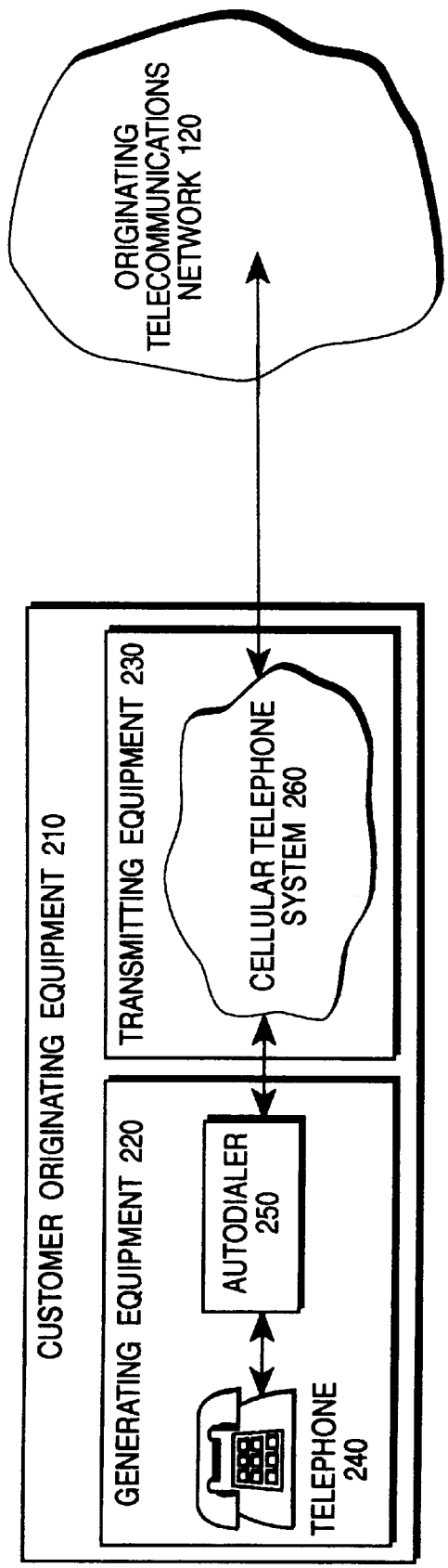
FIG. 2 is a diagram depicting a preferred embodiment of means for generating and transmitting a predetermined code for a system of the present invention for establishing a call telecommunications path.

In the preferred embodiment depicted in FIG. 2, originating telecommunications network 120 is also in communications with customer originating equipment 210. In this preferred embodiment, originating telecommunications network 120 provides a call communications path between customer originating equipment 210 and originating call processor 130 (not depicted in FIG. 2). Customer originating equipment 210 will be discussed in greater detail below.

In the preferred embodiment depicted in FIG. 1, originating call processor 130 and terminating call processor 150 are in communication with packet-based telecommunications network 140. In preferred embodiments, originating call processor 130 and terminating call processor 150 are able to communicate with packet-based telecommunications networks 140 that include frame-relay ("FR") networks, asynchronous transfer mode ("ATM") networks, other packet-based networks as are known to the art, or combinations of networks which include a packet-based network. In a preferred embodiment, packet-based telecommunications network 140 provides connectivity between all of the originating call processors and all of the terminating call processor which are in communication with packet-based telecommunications network 140, thus enabling any originating call processor to communicate with any selected terminating call processor. In an alternative embodiment, the packet-based telecommunications network provides connectivity between only certain designated combinations of originating call processors and terminating call processors. In the preferred embodiment depicted in FIG. 1, packet-based telecommunications network 140 provides a call communications path between originating call processor 130 and terminating call processor 150. In a preferred embodiment, the maximum transit time of packets through the packet-based telecommunications network is approximately 400 milliseconds.

In a preferred embodiment, the packet-based telecommunications network communicates voice information by transmitting the voice information using frame relay protocols superimposed on an ATM network. The direct transmission of voice over ATM networks may result in degraded quality due to the characteristics of the ATM protocols. This degradation may be fully or substantially avoided by transmitting voice via frame relay protocols which are in turn transported by an underlying ATM network.

Terminating Call Processor

In the preferred embodiment depicted in FIG. 1, terminating call processor 150 is in communication with packet-based telecommunications network 140 and public telecommunications network 160. In a preferred embodiment, terminating call processor 150 is a digital computer dedicated to call processing functions. In other preferred embodiments, terminating call processor 150 is a general purpose digital computer, a special purpose call processor, or other communications processor as is known in the art. In a preferred embodiment not depicted in FIG. 1, the terminating call processor and the originating call processor are embodied in the same equipment thus permitting, for example, the simultaneous processing of originating and terminating calls by a single apparatus.

In the preferred embodiment depicted in FIG. 1, terminating call processor 150 provides a call communications path between packet-based telecommunications network 140 and public telecommunications network 160 by performing format conversions between the two networks as is known in the art. In a preferred embodiment where terminating call processor 150 provides a full duplex call telecommunications path, terminating call processor 150 converts packetized information received from packet-based telecommunications network 140 to continuous analog information for output to public telecommunications network 160, and packetizes continuous analog information received from public telecommunications network 160 for output to packet-based telecommunications network 140.

Terminating call processor 150 has means, which are known in the art, for receiving the destination code from packet-based telecommunications network 140. For example, these receiving means may obtain a packet from packet-based telecommunications network 140 which is addressed to terminating call processor 150 and which contains the destination code.

Terminating call processor 150 also has means for converting the destination code to a destination address associated with destination 170 served by public telecommunications network 160. In a preferred embodiment, the format of the destination address is determined by the characteristics of the public telecommunications network. Continuing the example discussed above, the destination may be a business telephone with phone number (202) 662-6000 located in Washington, D.C., which is served by a local public switched telephone network ("PSTN"), with the terminating call processor also being connected to the same local PSTN. The business telephone, local PSTN, and terminating call processor of the example correspond to destination 170, public telecommunications network 160, and terminating call processor 150 of FIG. 1, respectively. Continuing the example, terminating call processor 150 receives a destination code containing the number "2026626000." In this example, terminating call processor 150 examines this number and determines that the destination can be contacted via the PSTN as a local call (from the terminating call processor), and further, determines whether terminating call processor 150 and destination 170 are within the same area code and if so, strips the "202" digits from the number (since these digits are used for calls to a different area code than that of terminating call processor 150), thus generating the destination address, and initiates a call to the destination via the PSTN using the remainder of the destination code (in this example "6626000").

Figure 5:
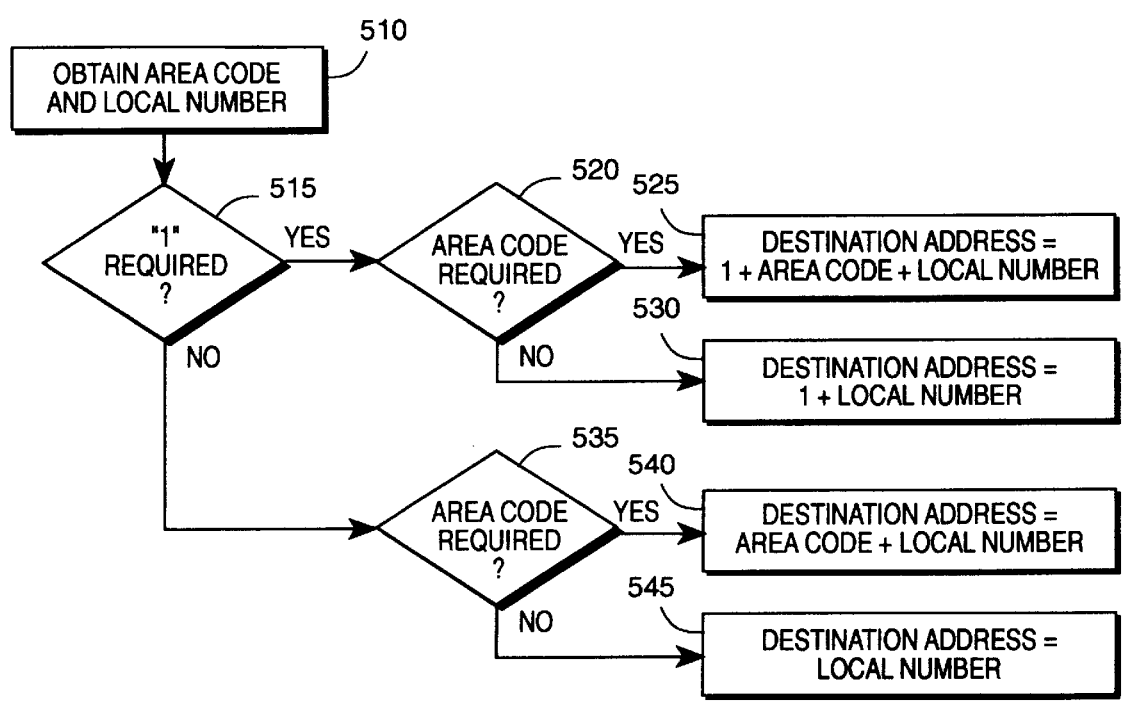
FIG. 5 is a flow chart depicting a preferred embodiment of a method for converting a predetermined code of a system of the present invention to a format required by a public switched network.

In a preferred embodiment, the method used by terminating call processors located in the United States to convert portions of the predetermined code to formats required by the public switched telephone networks in communication with those processors is depicted in FIG. 5. Beginning with obtain area code and local number step 510 of FIG. 5, the destination code is processed to obtain the destination's area code and local telephone number. "1" required? step 515 then determines if calling conventions of the public telecommunications network require that a "1" precede the destination telephone number in order to use the public telecommunications network to call from the terminating call processor to the destination.

If a "1" is required, then a further determination is made, in area code required? step 520, if calling conventions of the public telecommunications network require that the area code precede the destination local number in order to use the public telecommunications network to call from the terminating call processor to the destination. If the area code is required, as depicted in destination address=1+area code+local number step 525, the destination address is the local number preceded by a "1" and the area code. If the area code is not required, as depicted in destination address=1+local number step 530, the destination address is the local number preceded by a "1".

If a "1" is not required, then a further determination is made, in area code required? step 535, if calling conventions of the public telecommunications network require that the area code precede the destination local number in order to use the public telecommunications network to call from the terminating call processor to the destination. If the area code is required, as depicted in destination address=area code+local number step 540, the destination address is the local number preceded by the area code. If the area code is not required, as depicted in destination address=local number step 545, the destination address is the local number.

As is known in the art, this algorithm can be modified appropriately for embodiments of the invention which are used as dialing requirements change in a particular locality, which are located in other countries, or which communicate with public telecommunications networks with dialing plans different from those used by the United States PSTNs.

In a preferred embodiment not depicted in FIG. 1, echoes occurring in communications in either direction between the terminating call processor and the public telecommunications network are suppressed through the use of echo suppressing means as is known in the art. In a preferred embodiment, this echo suppressing means consists of commercial echo suppressing equipment which provides echo suppression periods of between approximately eight and approximately sixty-four milliseconds. In the preferred embodiment depicted in FIG. 1, terminating call processor 150 is in communications with public telecommunications network 160, which serves one or more destinations 170. In preferred embodiments, terminating call processor 150 is able to communicate with public telecommunications networks 160 that may include PSTNs, private switched telephone networks, PBXs, and other switched networks with dialing plans for the transmission of voice, fax, store-and-forward voice, store-and-forward fax, video, data and other telecommunications modes and services, as are known in the art.

Communications Paths

In the preferred embodiment depicted in FIG. 1, a call telecommunications path is established, responsive to the destination address, through originating telecommunications network 120, originating call processor 130, packet-based telecommunications network 140, terminating call processor 150, and public telecommunications network 160 to destination 170. A call path can be established using any technology or combination of technologies known in the art for establishing call telecommunications paths. In preferred embodiments, call telecommunications paths include voice, fax, store-and-forward voice, store-and-forward fax, data, video, and other telecommunications modes and services. In an alternate preferred embodiment not shown in FIG. 1, the call telecommunications path is established, responsive to the destination address, through the originating telecommunications network, the packet-based telecommunications network, and the public telecommunications network, but not through the originating call processor or the terminating call processor.

In another preferred embodiment not depicted in FIG. 1, means are provided for monitoring the status of call communications paths and, responsive to information derived from the status monitoring means, for deriving billing information for each telecommunications call. These monitoring and billing means are provided using technologies which are known to the art. For example, a monitoring computer in communications with both the originating and the terminating call processors may receive a message from the originating call processor noting the time each predetermined code is received, the time the call path is established, and the time the call is terminated. The monitoring computer may receive similar information from the terminating call processor for each call, including event information such as the failure of the destination to answer the call, the time the destination answered the call, and the time the destination terminated the call. For each predetermined code which led to the successful establishment of a call path, the monitoring computer may generate an accounting and a bill, based on the duration of the call and other information, for the entity identified in the predetermined code by a personal identification number or a billing identification.

In another preferred embodiment not depicted in FIG. 1, means are provided for optimizing routing. In a preferred embodiment of the means for optimizing routing, status messages are exchanged, as is known in the art, between some or all of the originating call processors and terminating call processors within a system of the present invention. The status messages may include information on the capacity, performance, operational status, and available routes of the originating call processors, the terminating call processors, and the telecommunications networks connected to those call processors. Based on the contents of the status messages, the originating and terminating call processors may, as is known in the art, route call telecommunications paths through the telecommunications networks associated with the call processors according to various optimization alternatives as are known in the art.

In a preferred embodiment, the means for identifying the terminating call processor is responsive to the means for optimizing routing. By way of example, two terminating call processors may be connected to the same destination via two different public telecommunications networks. An originating call processor, based on the status messages from the two terminating call processors, may choose to route calls to the destination via the terminating call processor providing the lowest cost path, the path with the shortest time delays, or in accordance with other optimization criteria. In an alternative preferred embodiment of the means for optimizing routing, the call processors may send status messages to a central status monitoring computer. The central status monitoring computer may then provide optimal routing information to the originating and terminating call processors as is known in the art. In other preferred embodiments, other methods for optimizing routing may be employed as is known in the art.

Customer Originating Equipment

In the preferred embodiment depicted in FIG. 2, customer originating equipment 210 includes means, which are responsive to a sequence of signals from a call originator, for generating the predetermined code. In this preferred embodiment the generating means is generating equipment 220 and includes telephone 240 and autodialer 250. In other preferred embodiments, the generating means may be, alone or in combination, a telephone, facsimile machine, modem, keypad, computer, PBX, autodialer, or other device as is know in the art for initiating and conducting telecommunications calls. In the preferred embodiment depicted in FIG. 2, customer originating equipment 210 also includes means for transmitting the predetermined code from the generating means to originating telecommunications network 120. In this preferred embodiment the transmitting means is transmitting equipment 230 and includes cellular telephone system 260. In other preferred embodiments, the transmitting means may include wire, radio, cellular telephone, fiber optic, satellite telecommunications, or other systems or combinations of systems, as are known in the art for transmitting telecommunications signals.

Two examples illustrate the use of generating means in combination with transmitting means of customer originating equipment 210. If the generating means consists of a telephone, the transmitting means is transmitting equipment associated with the telephone, and the originating telecommunications network is a leased telecommunications facility directly connected to the originating call processor, then the predetermined code can be made available to the originating call processor from the originating telecommunications network by entering the predetermined code on the telephone's keypad.

In a more complex case, the generating means may be a telephone in combination with an autodialer, the transmitting means may be transmitting equipment associated with the autodialer, and the originating telecommunications network may be a PSTN. Since a PSTN is involved, a connection from the telephone and autodialer through the PSTN to the originating call processor must be established before the predetermined code can be passed to the PSTN. The autodialer can automatically set up this connection in response to the entry of a specific sequence of signals on the telephone's keypad. Further, the autodialer can also create a complex predetermined code in response to such a specific sequence of signals and automatically communicate the predetermined code to the PSTN. If the specific sequence of signals is identical to the normal PSTN telephone number of the destination, then a user can make calls to the destination through this invention by following the same procedures as if the user was calling the destination directly through the PSTN.

A Comprehensive Example

Figure 3:
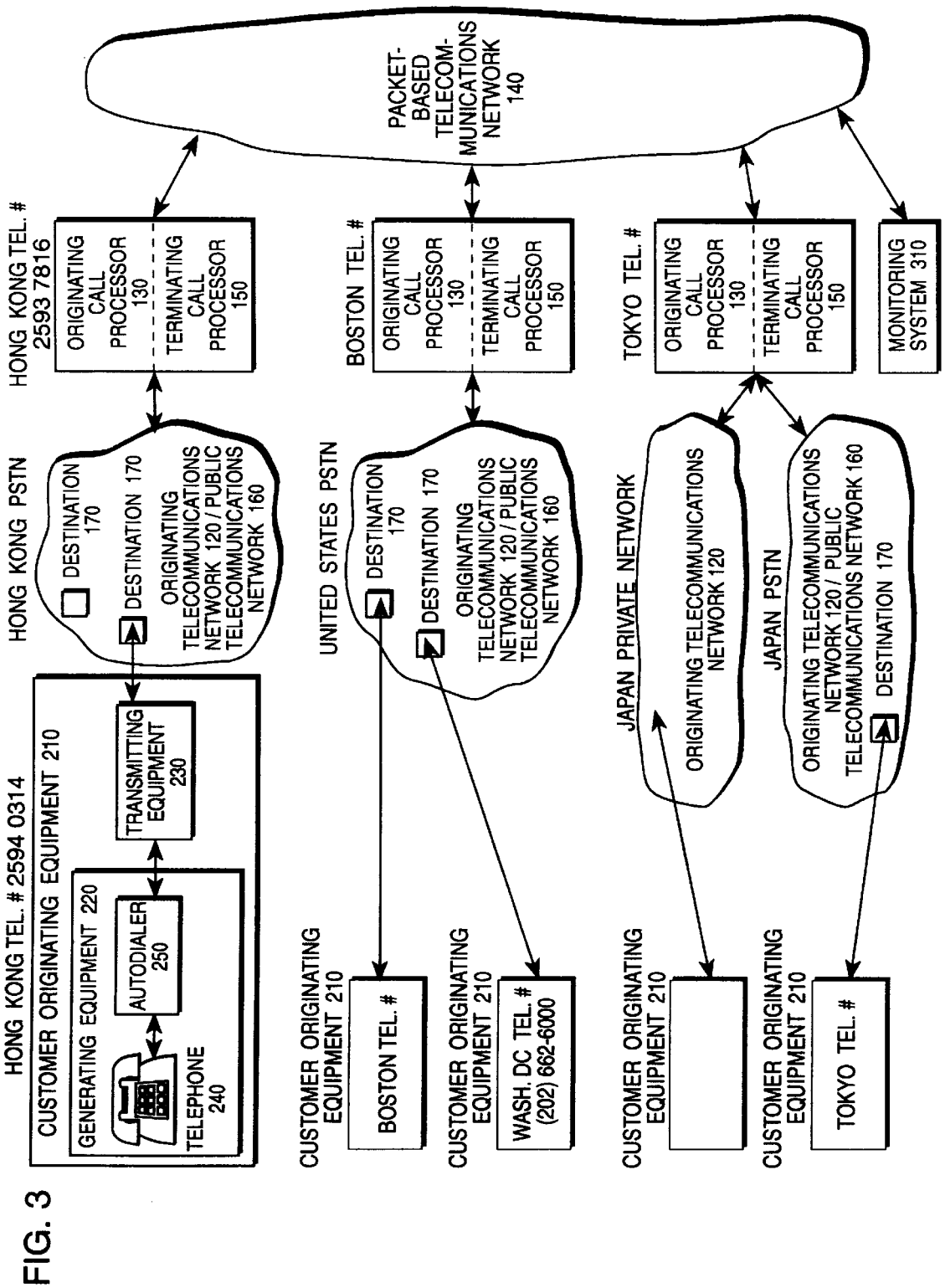
FIG. 3 is a diagram depicting an example of a preferred embodiment of a system of the present invention for establishing a call telecommunications path.

The following is a detailed example of the operation of the invention as depicted in a preferred embodiment depicted in FIG. 3. Apparatus located in Hong Kong embodies both originating call processor 130 and terminating call processor 150. Similar apparatus is located in Boston and in Tokyo. The combined originating call processor 130/terminating call processor 150 in each of these cities is in communication with a commercial international frame-relay network (corresponding to packet-based telecommunications network 140). Monitoring system 310 is also in communication with packet-based telecommunications network 140.

The combined originating call processor 130/terminating call processor 150 in Hong Kong is in communication with the Hong Kong public switched telephone network ("PSTN"), and can be contacted via the Hong Kong PSTN at 2593 7816. The Hong Kong PSTN is both originating telecommunications network 130 and public telecommunications network 160. One destination 170 on the Hong Kong PSTN has Hong Kong telephone number 2594 0314. At the location corresponding to 2594 0314 is customer originating equipment 210 including generating equipment 220 and transmitting equipment 230. Customer originating equipment 210 at the location corresponding to 2594 0314 includes telephone 240 and autodialer 250.

The combined originating call processor 130/terminating call processor 150 in Boston is in communication with the United States PSTN and can be contacted via the United States PSTN at a Boston telephone number. The United States PSTN is both originating telecommunications network 130 and public telecommunications network 160. One destination 170 on the United States PSTN has a Boston telephone number. At this Boston telephone number is customer originating equipment 210. Another destination 170 on the United States PSTN has the Washington, D.C. telephone number (202) 662-6000. At this Washington, D.C. telephone number is also customer originating equipment 210.

The combined originating call processor 130/terminating call processor 150 in Tokyo is in communication with the Japan PSTN and can be contacted via the Japan PSTN at a Tokyo telephone number. The Japan PSTN is both originating telecommunications network 130 and public telecommunications network 160. One destination 170 on the Japan PSTN has a Tokyo telephone number. At this Tokyo telephone number is customer originating equipment 210. The combined originating call processor 130/terminating call processor 150 in Tokyo is also in communication with a privately-owned telecommunications network. This privately-owned telecommunications network is also originating telecommunications network 120 and is in communications with customer originating equipment 210.

The following describes the exemplary operation of the invention in the context of a voice call from a customer in Hong Kong to a telephone at destination 170 in Washington, D.C. The telephone number of destination 170 in Washington, D.C., as it would have to be dialed in Hong Kong using the Hong Kong PSTN, and without the use of the invention, is 001 1 202 662 6000.

1. The customer in Hong Kong takes telephone 240 off-hook and dials the international phone number, 001 1 202 662 6000, of a telephone at destination 170 in Washington D.C. The Hong Kong customer dials just as if he was making a normal international call using the local Hong Kong PSTN.
2. Autodialer 250 recognizes the pattern dialed, i.e. 001 1 202 662 6000, as a call which should be routed through a system of the present invention rather than public international telephone channels. This recognition may be done by comparing the pattern dialed with a set of patterns stored in a routing table within the autodialer.

3. When autodialer 250 recognizes a call which should be routed through a system of the present invention, the autodialer will dial a local telephone number, for example 2593 7816, through the Hong Kong PSTN that terminates at Hong Kong originating call processor 130/terminating call processor 150.

4. Hong Kong originating call processor 130 will answer the call and provide a second dial tone to autodialer 250.

5. When autodialer 250 recognizes the second dial tone, it will send a predetermined code to Hong Kong originating call processor 130 via DTMF. The predetermined code will comprise a Personal Identification Number ("PIN"), the International Access Code, the Country Code, the Area Code, and the Local Number. The International Access Code, Country Code, Area Code and Local Number will all have been obtained from the customer by autodialer 250 when the customer dialed the international phone number for Washington D.C. destination 170. The PIN will be a number stored in autodialer 250. In this example, with a PIN of "12345", the predetermined code will be "12345001 12026626000". In an alternate embodiment which would require some additional operations by the customer, the customer could also provide the PIN to the autodialer.

6. Hong Kong originating call processor 130 will extract the PIN, "12345", from the predetermined code "12345001 12026626000", resulting in "0011 20266 26000 1" and compare the PIN to a table of valid PINs. If the PIN is not valid then the call is dropped. If the PIN is valid then processing continues and information concerning this call is sent from Hong Kong originating call processor 130 to monitoring system 310 via packet-based telecommunications network 140. Monitoring system 310 generates a record of the call. In a preferred embodiment, the customer may be required to enter the digits from a credit card so that the monitoring system can bill the credit card for the cost of the call.

7. Continuing to process the predetermined code, Hong Kong originating call processor 130 strips off the International Access Code, resulting in "12026626000", and determines the appropriate terminating call processor 150 to which to route the call. This determination is based on the country and city codes contained in the predetermined code, i.e. "1202", and may be performed by using all or a portion of the country and area codes as indexes to a table listing the available terminating call processors. Boston terminating call processor 150 is selected.

8. The destination code "2026626000", which includes the Area Code and the Local Number, is transmitted to Boston terminating call processor 150 via packet-switched network 140.

9. Boston terminating call processor 150 reformats the Area Code and Local Number to meet the requirements of the United States PSTN (serving here as public telecommunications network 160), producing the destination address. In this case, terminating call processor 150 is located in Boston but destination 170 is in Washington, D.C. This requires a long distance call by Boston terminating call processor 150 through the United States PSTN to Washington D.C. destination 170. A "1" is therefore added to the front of the Area Code and Local Number sequence by Boston terminating call processor 150 as required by United States long distance calling conventions, resulting in destination address "12026626000".

10. Boston terminating call processor 150 goes off-hook with the United States PSTN and sends out destination address dial digits "12026626000" as determined in the previous step to initiate the long distance call to destination 170 in Washington, D.C.

11. If the call to the destination by Boston terminating call processor 150 cannot be completed then the initiating call from Hong Kong is dropped. If the call to the destination is completed, then a voice path is provided from the Hong Kong telephone through the Hong Kong PSTN, Hong Kong originating call processor 130, packet-based telecommunications network 140, Boston terminating call processor 150, and the United States PSTN, to the destination 170. This completes the establishment of a call telecommunications path from Hong Kong to Washington, D.C.

12. Monitoring system 310 receives call status information from Hong Kong originating call processor 130 and Boston terminating call processor 150, via packet-based telecommunications network 140. Monitoring system 310 records the call status information, including the duration, and produces a bill.

Method for Establishing a Call Telecommunications Path

Figure 4:
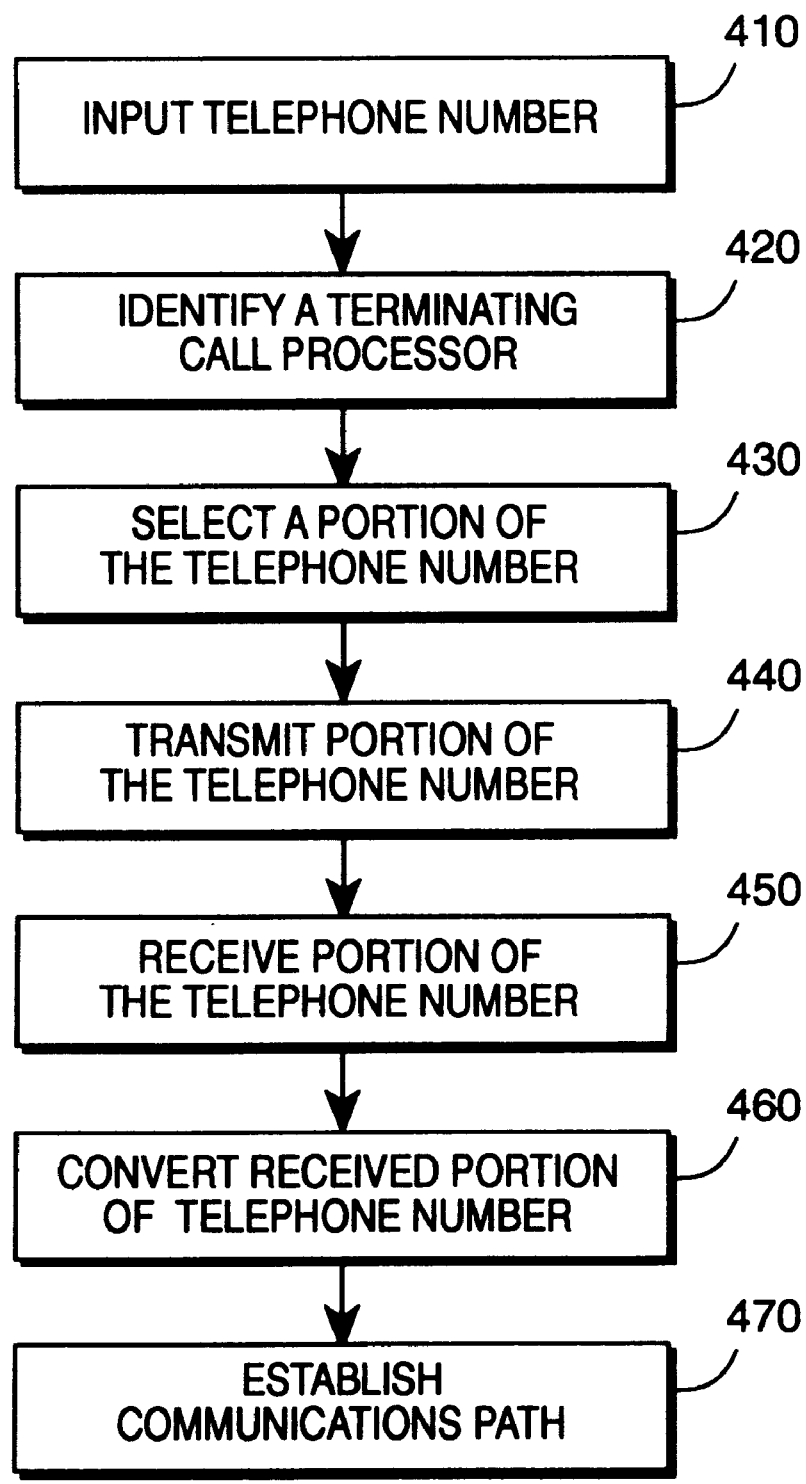
FIG. 4 is a flow chart depicting a preferred embodiment of a method of the present invention for establishing a call telecommunications path.

FIG. 4 depicts a flow chart of a preferred embodiment of a method for establishing a call telecommunications path. The method includes the steps of receiving a predetermined code from an originating telecommunications network into an originating call processor; identifying, based on all or a portion of the predetermined code, a terminating call processor; determining a destination code, based on the predetermined code; transmitting the destination code to the terminating call processor via a packet-based telecommunications network; receiving the destination code into the terminating call processor from the packet-based network; converting the destination code into a destination address associated with a destination served by a public telecommunications network; and establishing a communications path, based on the destination address, from the originating telecommunications network to the destination via the packet-based telecommunications network and the public telecommunications network.

In the preferred embodiment depicted in FIG. 4, the predetermined code receiving step is accomplished by input telephone number step 410. As discussed in reference to FIG. 1, originating call processor 130 which is in communication with originating telecommunications network 120 would input a predetermined code from originating telecommunications network 120 using techniques which are well known in the art. In the preferred embodiment depicted in FIG. 4, the predetermined code is a telephone number. As discussed above, in other preferred embodiments, the predetermined code may be a telephone number formatted in accordance with requirements of the originating telecommunications network, a sequence of characters selected in accordance with the formatting conventions of the dialing plan of a specific telecommunication system, or a sequence of characters predefined to specify a particular destination.

As is also discussed above, the format of the predetermined code may be determined by the characteristics of the public telecommunications network, the packet-based telecommunications network, and the originating telecommunications network. Also, in other preferred embodiments, the predetermined code may include personal identification information and/or a billing identification code. In preferred embodiments, the personal identification information may include a personal identification number, calling line identification information, or other caller identification information as is known in the art.

In the preferred embodiment depicted in FIG. 4, the identifying step is accomplished by identify a terminating call processor step 420. As discussed in reference to FIG. 1, originating call processor 130 would use all or a portion of the predetermined code as an index to a table of terminating call processors, or other techniques known to the art, to identify an appropriate terminating call processor. In the preferred embodiment depicted in FIG. 4 the telephone number, by way of example, would contain an area code. A table of terminating call processors would associate each terminating call processor with one or more area codes. In this example, indexing the table by the area code contained in the telephone number would identify the terminating call processor to which the call should be directed. In other preferred embodiments techniques known to the art would be used to identify the appropriate terminating call processor from the predetermined code.

In the preferred embodiment depicted in FIG. 4, the determining step is accomplished by select a portion of the telephone number step 430. As discussed in reference to FIG. 1, a specified algorithm may be used to calculate a destination code based on the predetermined code. In the preferred embodiment depicted in FIG. 4, the originating call processor would determine the portion of the telephone number which the terminating call processor requires in order to identify the destination. The result of this determination is the destination code.

In the preferred embodiment depicted in FIG. 4, the transmitting step is accomplished by transmit portion of the telephone number step 440. As discussed in reference to FIG. 1, originating call processor 130 and terminating call processor 150 are in communication with packet-based telecommunications network 140, and originating call processor 130 would transmit the destination code to packet-based telecommunications network 140 for delivery to terminating call processor 150 using techniques which are known in the art. In the preferred embodiment depicted in FIG. 4, the destination code, calculated in the previous step, is transmitted to the terminating call processor via the packet-based telecommunications network. As also discussed in reference to FIG. 1, packet-based telecommunications network 140, in alternative preferred embodiments, comprises a frame-relay network, an asynchronous transfer mode network, or another network technology as is known in the art which is fully or partially packet-based. As discussed above, in a preferred embodiment, the packet-based telecommunications network communicates voice information by transmitting the voice information using frame relay protocols superimposed on an asynchronous transfer mode network.

In the preferred embodiment depicted in FIG. 4, the destination code receiving step is accomplished by receive portion of the telephone number step 450. As discussed above and in reference to FIG. 1, terminating call processor 150 is in communication with packet-based telecommunications network 140 and would receive the destination code from packet-based telecommunications network 140 using techniques which are known in the art. In the preferred embodiment depicted in FIG. 4, the portion of the telephone number which was transmitted during transmit portion of telephone number step 440 would be received in receive portion of the telephone number step 450.

In the preferred embodiment depicted in FIG. 4, the converting step is accomplished by convert received portion of telephone number step 460. As discussed in reference to FIG. 1 above, the destination code received by terminating call processor 150 is converted into a destination address associated with destination 170 served by public telecommunications network 160. In the preferred embodiment depicted in FIG. 4, the received portion of the telephone number is formatted in accordance with the requirements of a public telecommunications network which serves both the destination and the terminating call processor. This formatted telephone number is the destination address which can be used by the terminating call processor to contact the destination through the public telecommunications network. By way of example, in the United States, if a long distance call is required by the public telecommunications network in order for the terminating call processor to contact the destination, then the dialing sequence, i.e. the destination address, would include a "1" followed by the area code and local number. On the other hand, if a local call is required by the public telecommunications network in order for the terminating call processor to contact the destination, then the dialing sequence, i.e. the destination address, may or may not require the area code but would require the local number. As discussed in reference to FIG. 1 above, the conversion would be implemented through the use of tables or other techniques known to the art.

In the preferred embodiment depicted in FIG. 4, the establishing step is accomplished by establish communication path step 470. As discussed in reference to FIG. 1 above, destination 170 is contacted through the use of the destination address and a call communications path is established from originating telecommunications network 120 to destination 170 via packet-based telecommunications network 140 and public telecommunications network 160. In the preferred embodiment depicted in FIG. 4, the terminating call processor uses the destination address to dial the destination via the public telecommunications network. After the destination is contacted, the call communications path from the originating telecommunications network to the destination is established using techniques known in the art.

In a preferred embodiment not depicted in FIG. 4, the method for establishing a call telecommunications path further includes the step of optimizing routing. In a preferred embodiment, the step of identifying a terminating call processor is responsive to the step of optimizing routing. As discussed above, the step of optimizing routing may be accomplished by performing routing in response to status messages passed between originating call processors and terminating call processors, by performing routing in response to status messages sent to a central status monitoring computer, or by performing routing by other means as are known in the art.

In a preferred embodiment not depicted in FIG. 4, the establishing step further comprises the steps of monitoring the status of the communications path and deriving billing information from that monitoring. As discussed in reference to FIG. 1 above, a variety of techniques known in the art for monitoring communications paths and deriving billing information may be used.

In a preferred embodiment not depicted in FIG. 4, the method for establishing a call telecommunications path further includes the steps of generating the predetermined code in response to a sequence of symbols from a call originator, and of transmitting the predetermined code to the originating telecommunications network. As discussed in reference to FIG. 2, a variety of techniques are available generating the predetermined code. These include, by way of example, telephones, PBXs, autodialers, and other methods known to the art. Also as discussed in reference to FIG. 2, a variety of techniques are available for transmitting the predetermined code to originating telecommunications network 120. These include, by way of example, wire, radio, fiber optics, satellites, and other methods known to the art.

In a preferred embodiment not depicted in FIG. 4, the predetermined code includes billing identification and the method of establishing a call telecommunications path further includes the step of validating the billing identification. As discussed in reference to FIG. 1, a variety of techniques are known in the art for validating billing identification including, by way of example, comparing the billing identification included in the predetermined code with a table containing valid billing identifications.

In a preferred embodiment not depicted in FIG. 4, the method for establishing a call telecommunications path includes the additional step of amplifying communications received from or transmitted to the originating telecommunications network. As discussed above, the amplifying means may include, by way of example, telecommunications amplifiers, PBXs, and other methods known to the art.

In a preferred embodiment not depicted in FIG. 4, the method for establishing a call telecommunications path includes the additional step of suppressing echoes generated or occurring on the telecommunications path, and particularly of suppressing echoes on communications received or transmitted to the public telecommunications network. As discussed above, the echo suppressing means may include commercial echo suppressors or other methods known to the art. It will be apparent to those skilled in the art that various modifications can be made to this invention of a system and method for establishing a call telecommunications path, without departing from the scope or spirit of the invention. It is also intended that the present invention cover modifications and variations of the system and method for establishing call telecommunications paths within the scope of the appended claims and their equivalents.

We claim:

1. A system for establishing a call telecommunications path, comprising:
   a terminating call processor, in communication with a packet-based telecommunications network and a public telecommunications network, having
      means for receiving a destination code from the packet-based telecommunications network, and
      means for converting the destination code to a destination address associated with a destination served by the public telecommunications network;
   an originating call processor, in communication with an originating telecommunications network and the packet-based telecommunications network, having
      means for receiving a predetermined code from the originating telecommunications network,
      means, responsive to a preselected portion of the predetermined code, for identifying the terminating call processor,
      means, responsive to the predetermined code, for determining the destination code, and
      means for transmitting the destination code to the packet-based telecommunications network; and
      means, responsive to the destination address, for establishing a call telecommunications path, through the originating telecommunications network, the packet-based telecommunications network, and the public telecommunications network, to the destination;
   wherein the packet-based network comprises a frame relay ("FR") network.

2. A system for establishing a call telecommunications path, comprising:
   a terminating call processor, in communication with a packet-based telecommunications network and a public telecommunications network, having
      means for receiving a destination code from the packet-based telecommunications network, and
      means for converting the destination code to a destination address associated with a destination served by the public telecommunications network;
   an originating call processor, in communication with an originating telecommunications network and the packet-based telecommunications network, having
      means for receiving a predetermined code from the originating telecommunications network,
      means, responsive to a preselected portion of the predetermined code, for identifying the terminating call processor,
      means, responsive to the predetermined code, for determining the destination code, and
      means for transmitting the destination code to the packet-based telecommunications network; and
      means, responsive to the destination address, for establishing a call telecommunications path, through the originating telecommunications network, the packet-based telecommunications network, and the public telecommunications network, to the destination;
   wherein the packet-based network comprises an asynchronous transfer mode ("ATM") network.

3. The system as set forth in claim 2, wherein the packet-based network communicates voice information by transmitting the voice information using frame relay protocols superimposed on an asynchronous transfer mode ("ATM") network.

4. A system for establishing a call telecommunications path, comprising:
   a terminating call processor, in communication with a packet-based telecommunications network and a public telecommunications network, having
      means for receiving a destination code from the packet-based telecommunications network, and
      means for converting the destination code to a destination address associated with a destination served by the public telecommunications network;
   an originating call processor, in communication with an originating telecommunications network and the packet-based telecommunications network, having
      means for receiving a predetermined code from the originating telecommunications network,
      means, responsive to a preselected portion of the predetermined code, for identifying the terminating call processor,
      means, responsive to the predetermined code, for determining the destination code, and
      means for transmitting the destination code to the packet-based telecommunications network; and
      means, responsive to the destination address, for establishing a call telecommunications path, through the originating telecommunications network, the packet-based telecommunications network, and the public telecommunications network, to the destination;

wherein the predetermined code includes personal identification information and wherein the personal identification information includes calling line identification information.

5. A system for establishing a call telecommunications path, comprising:

a terminating call processor, in communication with a packet-based telecommunications network and a public telecommunications network, having
means for receiving a destination code from the packet-based telecommunications network, and
means for converting the destination code to a destination address associated with a destination served by the public telecommunications network;

an originating call processor, in communication with an originating telecommunications network and the packet-based telecommunications network, having
means for receiving a predetermined code from the originating telecommunications network,
means, responsive to a preselected portion of the predetermined code, for identifying the terminating call processor,
means, responsive to the predetermined code, for determining the destination code, and
means for transmitting the destination code to the packet-based telecommunications network;
means, responsive to the destination address, for establishing a call telecommunications path, through the originating telecommunications network, the packet-based telecommunications network, and the public telecommunications network, to the destination; and
means for optimizing routing.

6. The system as set forth in claim 5, wherein the means for optimizing routing comprises an exchange of status messages between the originating call processor and the terminating call processor.

7. The system as set forth in claim 5, wherein the means for identifying the terminating call processor is responsive to the means for optimizing routing.

8. A method for establishing a call telecommunications path, comprising the steps of:

receiving into an originating call processor a predetermined code from an originating telecommunications network;

identifying, responsive to a preselected portion of the predetermined code, a terminating call processor;

determining, responsive to the predetermined code, a destination code;

transmitting the destination code from the originating call processor to a packet-based telecommunications network;

receiving, using the terminating call processor, the destination code from the packet-based telecommunications network;

converting the destination code obtained from the receiving step to a destination address associated with a destination served by a public telecommunications network; and establishing a call telecommunications path, responsive to the destination address, through the originating telecommunications network, the packet-based network, and the public telecommunications network to the destination;

wherein the packet-based telecommunications network comprises a frame relay ("FR") network.

9. A method for establishing a call telecommunications path, comprising the steps of:

receiving into an originating call processor a predetermined code from an originating telecommunications network;

identifying, responsive to a preselected portion of the predetermined code, a terminating call processor;

determining, responsive to the predetermined code, a destination code;

transmitting the destination code from the originating call processor to a packet-based telecommunications network;

receiving, using the terminating call processor, the destination code from the packet-based telecommunications network;

converting the destination code obtained from the receiving step to a destination address associated with a destination served by a public telecommunications network; and establishing a call telecommunications path, responsive to the destination address, through the originating telecommunications network, the packet-based network, and the public telecommunications network to the destination;

wherein the packet-based network comprises an asynchronous transfer mode ("ATM") network.

10. The method as set forth in claim 9, wherein the packet-based network communicates voice information by transmitting the voice information using frame relay protocols superimposed on an asynchronous transfer mode ("ATM") network.

11. A method for establishing a call telecommunications path, comprising the steps of:

receiving into an originating call processor a predetermined code from an originating telecommunications network;

identifying, responsive to a preselected portion of the predetermined code, a terminating call processor;

determining, responsive to the predetermined code, a destination code;

transmitting the destination code from the originating call processor to a packet-based telecommunications network;

receiving, using the terminating call processor, the destination code from the packet-based telecommunications network;

converting the destination code obtained from the receiving step to a destination address associated with a destination served by a public telecommunications network; and establishing a call telecommunications path, responsive to the destination address, through the originating telecommunications network, the packet-based network, and the public telecommunications network to the destination;

wherein the predetermined code includes personal identification information and wherein the personal identification information includes calling line identification information.

12. A method for establishing a call telecommunications path, comprising the steps of:

receiving into an originating call processor a predetermined code from an originating telecommunications network;

identifying, responsive to a preselected portion of the predetermined code, a terminating call processor;

determining, responsive to the predetermined code, a destination code;

transmitting the destination code from the originating call processor to a packet-based telecommunications network;

receiving, using the terminating call processor, the destination code from the packet-based telecommunications network;

converting the destination code obtained from the receiving step to a destination address associated with a destination served by a public telecommunications network;

establishing a call telecommunications path, responsive to the destination address, through the originating telecommunications network, the packet-based network, and the public telecommunications network to the destination; and optimizing routing.

13. The method as set forth in claim 12, wherein the step of optimizing routing comprises an exchange of status messages between the originating call processor and the terminating call processor.

14. The method as set forth in claim 12, wherein the step of identifying a terminating call processor is responsive to the step of optimizing routing.

* * * * *